United States Patent Office 3,445,359
Patented May 20, 1969

3,445,359
PROCESS FOR THE JOINT MANUFACTURE OF
2,2,3- AND 1,3,3-TRICHLOROBUTANES
Herbert Baader, Hermulheim, near Cologne, Kurt Sennewald, Knapsack, near Cologne, and Helmut Reis, Hurth, near Cologne, Germany, assignors to Knapsack Aktiengesellschaft, Knapsack, near Cologne, Germany, a corporation of Germany
No Drawing. Filed Sept. 26, 1966, Ser. No. 581,755
Claims priority, application Germany, Nov. 16, 1965,
K 57,674
Int. Cl. C07c *17/10;* B01j *1/10*
U.S. Cl. 204—163                                   6 Claims

ABSTRACT OF THE DISCLOSURE

A process for jointly manufacturing 2,2,3- and 1,3,3-trichlorobutanes by contacting 2,2-dichlorobutane with a reactive amount of chlorine and exposing the mixture to ultraviolet light.

---

The present invention relates to a process for the joint manufacture of 2,2,3- and 1,3,3-trichlorobutanes.

2,2,3-trichlorobutane is known to be an important starting product for making 2-chlorobutadiene-(1,3). It is known that 2,2,3-trichlorobutane can be produced by the additive combination of chlorine with 2-chlorobutene-(2). The chlorination of butene-(2) or butane results in the formation of mixtures of isomers which inter alia include small amounts of 2,2,3-trichlorobutane. The formation of 2,2,3-trichlorobutane as the principal product, obtained in addition to 1,2,3-trichlorobutane, was first observed during the chlorination of meso-2,3-dichlorobutane with exposure to light radiated by a 100 watt lamp (cf. Beilstein, vol. I, supplement III, page 285).

However, these conventional processes entrain difficulties. The chlorination of butane and butene-(2) results in the formation of 2,2,3-trichlorobutane. This compound is obtained either as a by-product or considerable proportions of by-products are simultaneously obtained, e.g. 1,2,3-trichlorobutane and 2,2,3,3-tetrachlorobutane, which are difficult to transform, if at all, into 2-chlorobutadiene-(1,3).

The preparation of 2,2,3-trichlorobutane by subjecting 2,3-dichlorobutane to catalytic dehydrochlorination followed by chlorination of the 2-chlorobutene-(2) initially obtained is a complicated procedure involvign two processing stages which both produce considerable difficulties. For example, the dehydrochlororination of 2,3-dichlorobutane in contact with a BaCl₂/active carbon catalyst incurs resinification of the catalyst after a short reaction period, and the catalyst activity decreases. Yields are therefore poor. The successive chlorination of 2-chlorobutene-(2) with the exclusion of light produces 2,2,3-trichlorobutane in a yield as low as 77%.

Another known process necessitates adding NaHCO₃ during the chlorination, which is continuously consumed. The by-products obtained in this process are useless. The chlorination of pure meso-2,3-dichlorobutane is said to result in the formation of 2,2,3-trichlorobutane as the principal product, but no yield data have been given, and 1,2,3-trichlorobutane was obtained as a by-product.

It is therefore of particular interest to describe a process wherein the formation of tri- and tetrachlorobutanes not directly transformable by dehydrohalogenation into 2-chlorobutadiene-(1,3) is substantially avoided.

To this end, in accordance with the present invention, 2,2-dichlorobutane is chlorinated, the chloriationn resulting in the formation of a mixture comprising two main products, namely the expected 2,2,3-trichlorobutane and the unexpected previously unknown 1,3,3-trichlorobutane.

The two products can be transformed into 2-chlorobutadiene-(1,3) both in the form of a mixture and in pure form by being subjected to dehydrochlorination to remove two mols HCl. The mixture comprising the above two trichlorobutanes is produced by introducing chlorine with exposure to ultraviolet light into a solution of 2,2-dichlorobutane. This results in the substitution of a hydrogen atom at the 2,2-dichlorobutane accompanied by the evolution of hydrogen chloride.

The reaction is performed in the liquid phase. To this end, 2,2-dichlorobutane is first placed into a reactor and liquid or gaseous chlorine is introduced then. The reaction temperature may accordingly vary, in the absence of a solvent, between the melting point (−74° C.) and the boiling point (+102° C.) of 2,2-dichlorobutane. Within that range, the composition of the reaction products is substantially not influenced by the temperature.

In order to avoid overchlorination during the reaction, no more than about 50% of the 2,2-dichlorobutane is allowed to undergo transformation in discontinuous operation. Solvents, e.g. carbon tetrachloride, carbon disulfide, benzene, chlorobenzene, butene, dichlorobutane and similar solvents, must not but may advantageously be added, depending on the reaction conditions, e.g. in an attempt to prevent 2,2,3-trichlorobutane from being precipitated. Ultraviolet light is used with the object of accelerating the reaction by activation of the chlorine.

The fact that 2,2-dichlorobutane does not decompose is an unexpected result of the reaction, particularly with respect to the ultraviolet light used, because this compound is known to undergo decomposition accompanied by dehydrochlorination into other products, predominantly into 2-chlorobutene-(2) and 2-chlorobutene-(1) when stored and distilled in daylight. If however, the compound is formally assumed first to undergo decomposition and the trichlorobutanes are assumed to be formed then as a result of an additive combination of chlorine to the double bond of 2-chlorobutene-(2) and 2-chlorobutene-(1), the reaction would have been expected to produce 1,2,2-trichlorobutane as the principal product in addition to 2,2,3-trichlorobutane. But this is inconsistent with experiments. The formation of 1,3,3-trichlorobutane is therefore believed to be the result of a substitution of the β-position in the 2,2-dichlorobutane. The fact that the β-substitution proceeds so selectively is clearly a quite unexpected result.

The course of the reaction is of particular interest in industry for the reason that 2,2-dichlorobutane is very readily obtainable in good yields from butyn-(2) or 2-chlorobutene-(2). Butyn-(2) is obtained as a waste product originating from the production of butadiene-(1,3) from butane. 2,2,3- and 1,3,3-trichlorobutanes are compounds which can be transformed by dehydrochlorination into 2-chlorobutadiene-(1,3). This means that 2-chlorobutadiene-(1,3) can be produced by subjecting 2,2-dichlorobutane to chlorination followed by dehydrohalogenation.

In contrast with the chlorination of 2,3-dichlorobutane the chlorination of 2,2-dichlorobutane produces no 1,2,3-trichlorobutane. The transformation of this latter compound into dichlorobutanes useful for making 2-chlorobutadiene-(1,3) is difficult to achieve and calls for the use of sodium hydroxide or an amine hydrochloride melt.

The present invention relates more particularly to a process for the joint manufacture of 2,2,3- and 1,3,3-trichlorobutanes, wherein 2,2-dichlorobutane is reacted with chlorine with exposure to ultraviolet light. The reaction is generally carried out at temperatures varying between −74° C. and +102° C., preferably between about −50 and +50° C. the chlorine should conveniently be used at a rate of about 0.5 to 1 mol, advantageously at a rate of 0.5 to 0.7 mol, per mol 2,2-dichlorobutane. The reaction mixture comprising substantially 2,2,3- and 1,3,3-trichlorobutanes can be freed from dissolved hydrogen chloride and separated into its two constituents by fractional distillation.

EXAMPLE 1145 grams (9 mols) 2,2-dichlorobutane were placed into a 2-liter flask equipped with stirrer, UV-lamp (70 watt mercury high pressure lamp, Q 81 of Quarzlampen G.m.b.H., Hanau), thermometer and feed pipe, and gaseous chlorine was introduced then for a period of 3 hours, at a rate of 35 to 40 liters/hr., at a temperature of $-10°$ C., and with exposure to the light radiated by the UV-lamp. About 50% of the product underwent chlorination. The hydrogen chloride set free during the chlorination was expelled by means of nitrogen and/or by boiling and the reaction product was subjected to fractional distillation. The gas chromatogram of the trichlorobutane mixture substantially showed two peaks, of which one was attributable to 2,2,3-trichlorobutane, and of which the other showed retention times the same as the product obtained by reacting 1-chlorobutanone-(3) with phosphorus pentachloride. The 2,2,3-trichlorobutane, which made about 65% of the trichlorobutane formed, was compared further with specimens of 2,2,3-trichlorobutane prepared in different manner, by determination of mixed melting point ($-17°$ C.), boiling point (144° C. under a pressure of 760 mm. mercury), and refractive index $$(n_D^{20} = 1.4645)$$

The 1,3,3-trichlorobutane not previously described in literature was identified in analogous fashion by comparing it with the compound prepared in the manner set forth above. A pure fraction thereof obtained by gas chromatography had a boiling point of 156° C. (under a pressure of 760 mm. mercury), a melting point of $-46°$ C. and a refractive index $n_D^{20} = 1.4658$. The density $D_4^{20}$ was 1.2725.

The 1145 grams 2,2-dichlorobutane subjected to chlorination gave 543 grams 2,2,3-trichlorobutane, 246 grams 1,3,3-trichlorobutane and 478 grams unreacted 2,2-dichlorobutane. In other words (667 grams of the 2,2-dichlorobutane used underwent conversion (about 58%). The 2,2,3-trichlorobutane was obtained in a yield of 64%, referred to the 2,2-dichlorobutane which underwent conversion, and the 1,3,3-trichlorobutane produced simultaneously was obtained in a yield of 29%; the total yield of trichlorobutanes accordingly was 93%. The 2,2,3-trichlorobutane and 1,3,3-trichlorobutane could be separated from one another by fractional distillation, but this is not absolutely necessary for their transformation into 2-chlorobutadiene-(1,3).

We claim:
1. A process for the joint manufacture of 2,2,3-trichlorobutane and 1,3,3-trichlorobutane which comprises reacting 2,2-dichlorobutane with chlorine with exposure to ultraviolet light.
2. The process of claim 1, wherein the reaction is carried out at a temperature of about $-74$ to $+102°$ C.
3. The process of claim 2, wherein the reaction is carried out at a temperature of about $-50$ to $+50°$ C.
4. The process of claim 1, wherein the chlorine is used at a rate of about 0.5 to 1 mol per mol 2,2-dichlorobutane.
5. The process of claim 4, wherein the chlorine is used at a rate of about 0.5 to 0.7 mol per mol 2,2-dichlorobutane.
6. The process of claim 1, wherein the resulting reaction mixture comprising substantially 2,2,3-trichlorobutane and 1,3,3-trichlorobutane is freed from dissolved hydrogen chloride and separated into its constituents by fractional distillation.

References Cited

UNITED STATES PATENTS 3,405,046   10/1968   Sennewald et al. _____ 204—163

HOWARD S. WILLIAMS, *Primary Examiner.*